UNITED STATES PATENT OFFICE.

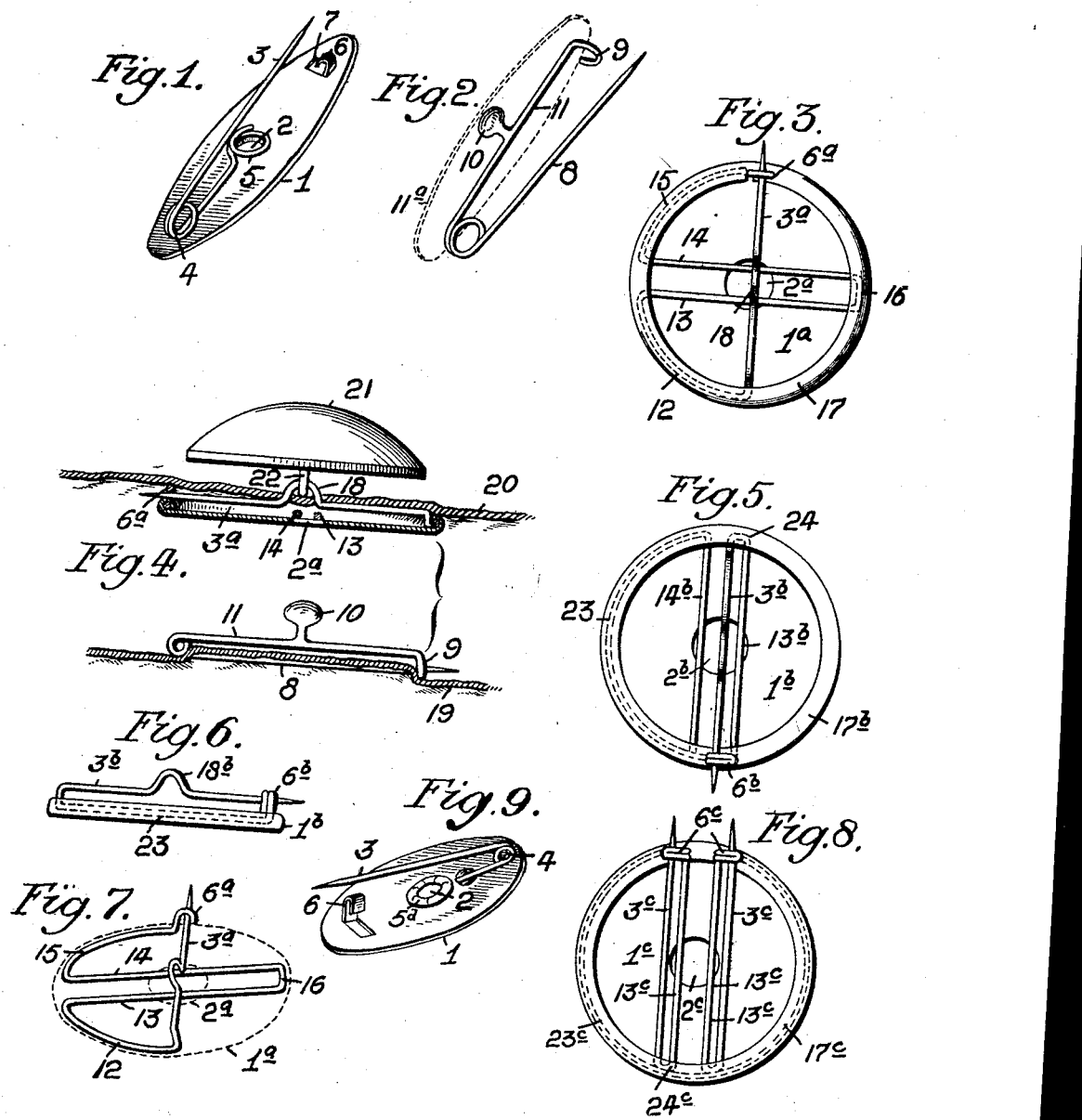

IDA V. BENOIT, OF BROOKLYN, NEW YORK.

PIN-ATTACHED SEPARABLE FASTENER.

1,354,159. Specification of Letters Patent. Patented Sept. 28, 1920.

Application filed April 10, 1918. Serial No. 227,789.

*To all whom it may concern:*

Be it known that I, IDA V. BENOIT, a citizen of the United States of America, residing at 1004 Bergen street, Brooklyn, in the county of Kings and State of New York, have invented certain new and useful Improvements in Pin-Attached Separable Fasteners, of which the following is a specification.

This invention relates to separable fasteners of the same general type disclosed in my Patent No. 1,254,648 granted January 29, 1918.

One of the principal objects of the present invention is to provide a separable fastener which may be readily applied to cloth, fabric or other flexible material and readily detached therefrom and which is simple in design, of comparatively few parts and consequently easy to manufacture. Other objects and advantages will appear as the invention is hereinafter developed.

Referring to the drawings which illustrate what I now consider the preferred forms of my invention:

Figure 1 is a perspective of one form of socket member.

Fig. 2 is a similar view of a head member.

Fig. 3 is a plan view of a modified form of socket member.

Fig. 4 is an elevation, partly in section, of a complete fastener.

Fig. 5 is a view similar to Fig. 3, but of a further modification.

Fig. 6 is an elevation of the socket member shown in Fig. 5.

Fig. 7 is a perspective of the socket member shown in Figs. 4 and 5, the reinforcing plate being shown in dotted lines.

Fig. 8 is a view similar to Fig. 5 but illustrative of a further modification and Fig. 9 is a perspective of a still further modified form of socket member.

The socket member of my device may assume various forms. Thus in Fig. 1 I have illustrated a base or reinforcing plate 1 in the form of a disk provided with an aperture 2 through which the head of the head member, hereinafter described, is adapted to pass. Secured to said plate 1 in any suitable manner, as for example by solder, is a pin 3, preferably constructed of resilient, metallic wire. To enhance the resiliency of the pin, it may be turned on itself as indicated at 4. I provide resilient head gripping means adjacent the opening 2, preferably on the same side of plate 1 as the pin 3. This means may be conveniently formed by twisting the end of the same wire, which forms the pin, to form a helix or spiral 5 of slightly less diameter than the head hereinafter described. The method of applying the socket member to the flexible material will also be explained hereinafter. I provide a hook for the pin 3, which hook, as indicated in Fig. 1, may be formed by striking up and curving a portion 6 of the plate 1. An opening 7 is formed thereby.

While the head member may assume various forms I prefer to construct it in the form of a safety pin with a head secured to the shank thereof. Thus in Fig. 2 I have illustrated a pin 8 having a hook 9 integrally connected thereto and a button 10 secured, preferably integrally, to the shank 11 of said pin.

Instead of forming the pin as illustrated in Fig. 1, it may be formed as indicated in Figs. 3, 4 and 7. In this form a comparatively long piece of wire is sharpened at one end to form the pin $3^a$, bent to form an arc of a circle at 12, bent again to form a chord 13, back again to form a chord 14, then again to form an arc of a circle at 15. The last mentioned portion terminates in a hook shaped portion $6^a$ corresponding to the hook 6 in Fig. 1. This form of pin may be secured to its plate $1^a$ by flanging over the edge of the latter, as indicated at 17, to grip the arcs 12, 15 and the portion 16 which joins the chords 13 and 14. By spacing the chords 13, 14 a distance apart slightly less than the diameter of head 10 said chords may be made to serve as the gripping means of said head. The pin $3^a$ may be provided with a humped up portion 18 for a purpose which will hereinafter appear.

The operation of my invention as thus far described is substantially as follows. The head member is secured to its material 19, by passing the pin 8 through said material and back again, then snapping it under the hook 9 as indicated in Fig. 4. The socket member, shown in Fig. 3, may be secured to its material 20 by passing the pin $3^a$ through the material then if desired through the shank 22 of a button 21 of any suitable form, material and ornamentation, then back through the material and then under the hook $6^a$. The head 10 may then be snapped into opening $2^a$ between chords 13, 14, in which position it will be securely but detachably gripped and held. Obviously the socket member shown in Fig. 1, or any of those hereinafter described may be applied to the material in a manner, similar to that above described. It will be noted that the hump 18 forms an upstanding eyelet for the shank 22.

A socket member somewhat similar to that illustrated in Fig. 3 may be formed as indicated in Figs. 5 and 6 in which similar parts are designated by the same numerals with a "b" added. In this embodiment of the invention, one end of the wire forms a pin 3$^b$. The wire is then bent at 24, carried across at 13$^b$, bent up, passed through a suitable opening in flange 17$^b$, doubled upon itself to form a hook 6$^b$, passed back through flange 17$^b$, bent to form an arc 23, finally terminating in a chord 14$^b$. The plate 1$^b$ is then flanged over at 17$^b$ to grip the wire portions 23 and 24 firmly.

Two pins 3$^c$ may be provided for the socket member instead of one, such an arrangement being shown in Fig. 8. This form may be constructed as set forth in connection with the description of the member shown in Fig. 5 except that each pin 3$^c$ is formed to the side of chord 13$^c$ away from the opening 2$^c$ and instead of terminating the wire to form a chord 14$^b$ the arc 23$^c$ assumes the form of almost a complete circle and is then shaped to form what may be termed a safety pin.

The form of resilient socket shown in Figs. 1 to 8 may be modified by providing a resilient eyelet 5$^d$ similar to a glove fastener under the opening 2 in plate 1, as shown in Fig. 9.

As previously stated any of the socket members may be substituted for the one shown in Fig. 4. Furthermore, other modifications will suggest themselves to persons skilled in the art, but to avoid unnecessary multiplication of views and surplusage in description, I have restricted the present disclosure to a few of the physical embodiments preferred at this time. It will be seen that in all forms both the socket and head members are adapted to be secured to the material by pins 3, 3$^a$, 3$^b$ or 3$^c$ coöperating with hooks 6, 6$^a$, 6$^b$ or 6$^c$ which members form in effect a safety pin attachment.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

If desirable, a reinforced plate 11$^a$ may be soldered or otherwise secured to the shank 11 of the head member, as indicated in dotted lines in Fig. 2.

Having described my invention, what I claim and desire to secure by Letters Patent is:

1. In a separable fastener, a head member, and a socket member, said socket member comprising a pin adapted to be passed at least once through the material and back again and resilient gripping means integrally connected to said pin and adapted to receive the head member.

2. In a separable fastener, a head member, and a socket member, said socket member comprising a pin adapted to be passed at least once through the material and back again, a hook adapted to be engaged by the free end of said pin, and resilient gripping means integrally connected to said pin and adapted to receive the head member.

3. Means for detachably securing flexible materials comprising a socket member, a head member and a button, said socket member comprising a pin adapted to be passed through one of said materials, then through the shank of said button and then back through the material.

4. A separable fastener comprising a head member and a socket member, said socket member comprising a plate, a pin secured to said plate, a hook for said pin secured to said plate, and resilient gripping means integrally secured to said pin and adapted to grip said head member.

5. A separable fastener comprising a head member and a socket member, said socket member comprising a flanged plate, a pin, resilient gripping means integrally connected to said pin, a plurality of arc-shaped members integrally connected to said gripping means, said arc shaped members being secured between said flange and plate and a a hook secured to said plate.

6. The combination with a socket member, of means for securing said member to flexible material, said means comprising a button and a pin secured to said socket member and adapted to be passed through the material, then through the shank of said button and then back through said material.

7. The combination with a socket member, of means for securing said member to flexible material, said means comprising a button, a pin secured to said socket member and adapted to be passed through said material and the shank of said button and a hook for said pin secured to said socket member.

In testimony whereof I have affixed my signature.

IDA V. BENOIT.